United States Patent [19]

Simpson

[11] Patent Number: 5,101,692
[45] Date of Patent: Apr. 7, 1992

[54] DRILL BIT OR COREHEAD MANUFACTURING PROCESS

[75] Inventor: Neil A. A. Simpson, Aberdeen, United Kingdom

[73] Assignee: Astec Developments Limited, Aberdeen, Scotland

[21] Appl. No.: 582,495

[22] Filed: Sep. 14, 1990

[30] Foreign Application Priority Data

Sep. 16, 1989 [GB] United Kingdom ............... 8921017

[51] Int. Cl.$^5$ .................... B21K 5/02; E21B 10/46
[52] U.S. Cl. ..................... 76/108.2; 76/DIG. 11; 76/DIG. 12
[58] Field of Search ............ 76/108.1, 108.2, 108.4, 76/DIG. 11, DIG. 12; 164/516, DIG. 15; 175/409, 327, 411

[56] References Cited

U.S. PATENT DOCUMENTS 3,041,688  7/1962  Wilder ..................... 164/516
4,423,646  1/1984  Bernhardt ................. 76/108.1
4,499,795  2/1985  Radtke ..................... 76/108.2
4,667,543  5/1987  Tsugaki et al. ............ 76/108.2

FOREIGN PATENT DOCUMENTS 1549211  6/1976  United Kingdom .

OTHER PUBLICATIONS

A Realistic Appraisal of the Precision Investment Casting Process, W. O. Sweeny, The Iron Age, Nov. 6, 1947, pp. 86–90.

Primary Examiner—Roscoe V. Parker
Attorney, Agent, or Firm—Ratner & Prestia

[57] ABSTRACT

A two-part investment casting process is described which involves first casting a hard material shell (32) such as stellite, which is threaded or profiled internally to allow attachment to a pre-machined shank (44) such that the advantages of a fluid and wear resistant investment casting of complex shape may be combined with a tough and machinable shank to allow attachment to the drill string.

12 Claims, 4 Drawing Sheets

DRILL BIT OR COREHEAD MANUFACTURING PROCESS

This invention relates to a method of manufacturing petroleum/mining drill bits or coreheads (coring bits) with synthetic and natural diamond materials by utilising investment casting methods.

BACKGROUND OF THE INVENTION

Current methods for producing drill bits/coreheads (coring bits) utilise a matrix or a steel body.

In the matrix type, tungsten carbide powder matrix is formed in a thick shell around a steel inner core which carries the threaded connection. The cutters are then brazed on to the pre-formed matrix shell.

This method is suitable since the tungsten carbide matrix is very resistant to fluid erosion and abrasive wear, natural diamonds can be included in the matrix shell for gauge protection, and relatively complex shapes can be produced.

However, the method suffers from the disadvantages that possible breakdown of bond between the matrix shell and steel core may occur, manufacture of the graphite mould is precision work requiring high labour input, and the cost is high due to the quantity of carbide required.

Also, the differential of contraction between matrix shell or steel core may cause cracking especially in the larger products and further, poor quality of the matrix body formed necessitates extensive hand fettling.

In the steel body type, the normal method of manufacture is by machining from the solid using multi-axis milling machines and then hard-facing using welding or spray metal techniques prior to the installation of the cutters. These cutters are either brazed in place or pressed into prepared holes and held in place by an interference fit.

The advantages of the steel body type are a single unit construction with no possibility of break-up due to bond failure or cracking, low cost materials, and CNC multi-axis milling machine techniques give good repeatability for batch production. However, the steel body type method is labour intensive, in that hard facing has to be applied after machining, and any surplus hardfacing has to be hand-ground away from cutter pockets prior to installation. Also, the allowable complexity of shape is restricted by limitations of machining capabilities.

It has previously not been considered a viable solution to manufacture drill bits/coreheads (coring bits) utilising investment casting techniques; the matrix and CNC machining approach being far more established and understood than this hitherto unkown method of manufacturing.

The accepted standard method of manufacturing an investment casting for industrial products such as aircraft turbine blades and engine components is as follows:

A master mould be manufactured to cast accurate wax males of the product required. The wax males are then coated with a ceramic material by dipping them in a slurry and then raising sand on the wet slurry. This is done a number of times, allowing the slurry and sand coating to dry before re-dipping.

In this way, a thick coating of material is built up around the wax male. The coated wax male is then furnaced to bake the coating and melt out the wax, thus creating an accurate ceramic mould of the product to be cast.

Under normal circumstances, this method of manufacture would not be used to produce a steel-bodied drill bit or corehead (coring bit) due to the fact that it would require subsequent hard facing after casting in order to withstand the fluid erosion and abrasive wear experienced downhole. The application of this hard facing by spray metal or welding techniques would cover or damage the accurately-formed profile of the investment cast product thus spoiling the dimensional accuracy and therefore defeating the purpose of using this process in the first place.

It is an object of the invention to obviate or mitigate the above disadvantages by utilising the investment casting process in a novel method of manufacture to produce a highly accurate and, if required, complex casting, which needs little refinishing prior to installation of the cutters.

SUMMARY OF THE INVENTION

According to a first aspect of the present invention, there is provided a method of fabricating a drill bit or corehead, said method comprising the steps of forming a relatively hard outer shell by investment casting, and connecting the shell to a pre-machined bit shank.

The connection of the outer shell to the bit shank is preferably by a screw-thread connection, and the screw-thread connection is preferably locked by a mechanical lock and/or by fusion bonding of mating threaded surfaces and/or of adjacent portions of the connected components.

According to a second aspect of the present invention there is provided a drill bit or corehead, manufactured by the method according to the first aspect of the present invention.

The method of the invention combines the advantages of both matrix and steel bodied type production, substantially reducing the labour content per manufactured unit, thus greatly enhancing the possibilities of mass production.

Embodiments of the invention will now be described by way of example.

In order to achieve a product which would fulfill the requirements of the industry, it was necessary to devise a method of investment casting a hard bit body whilst retaining a tough machinable central core. This was achieved by casting the bit body utilising investment casting methods and pre-machining the bit shank; then connecting the two items together using both mecanical and fusion locking mechanisms.

According to the present method of manufacture the drill bit or corehead will be made as two separate components in a two-part manufacturing process. The purpose of producing the bit in two components is that the bit shank requires different properties to the bit head i.e.

the bit head requires
- to be resistant to abrasive wear
- to be resistant to fluid erosion the shank requires
- to be easily machinable
- to have the capability of withstanding high stress/fatigue levels These properties are not reaslistically achievable from one material.

The complex form of a drill bit head is difficult and expensive to machine and therefore lends itself to the casting process. The bit shank on the other hand is an easily machined component which can be manufactured by most oil industry type lathes.

According to the novel manufacturing process of the present invention, the first stage is to produce an accurate male wax model of the bit head to be cast. This can be achieved in a number of ways:

Method 1—it can be machined from the sold piece of wax attached to a mandrel. (This is a particularly useful approach for prototyping or batch production.)

Method 2—wax injection mould dies can be manufactured for the particular component and injection moulded wax males can be produced. This is particularly suitable for mass production.)

Method 3—A combination of methods 1 and 2 can be used i.e. injection mould the basic shape and carry out minor machining on the wax. (This allows for greater flexibility for cutter and gauge protection slug positioning while maintaining the advantages of relatively low cost mass produced waxes.)

Method 4—Wax injection moulds can be produced for the bit in component form and these mass produced component parts assembled at the wax stage to produce a variety of bits. (This allows for mass production of a variety of products at relatively low cost).

The second stage of manufacture is to produce a ceramic mould from the wax male which has been produced by one of the above methods.

This is done by the conventional investment casting method as previously described.

The third stage is to make an investment casting by pouring molten alloy into the prepared ceramic mould thus producing an exact copy of the original wax male.

This casting would be of a material which is highly resistant to abrasive wear and fluid erosion in its cast state, i.e. the high content cobalt alloys such as stellite.

This casting would incorporate all the cutter and gauge slug pockets to a high degree of accuracy. It would also include fluid porting and nozzle positions together with an internal attachment profile such as a thread.

The fourth stage is to clean up nozzle positions and internal attachment profile after casting and NDT (non-destructive testing), by minor machining work and hand fettling.

The fifth stage is to furnace braze the cutter and gauge protection slugs into the cast head, using furnace or torch brazing techniques.

The sixth stage is to attach a pre-machined shank to the prepared bit head, make up to the required torque and mechanically lock into position.

BRIEF DESCRIPTION OF THE DRAWINGS

Further embodiments of the present invention will now be described by way of example with reference to the accompanying drawings in which.

DESCRIPTION OF PREFERRED EMBODIMENTS

Figure 1:
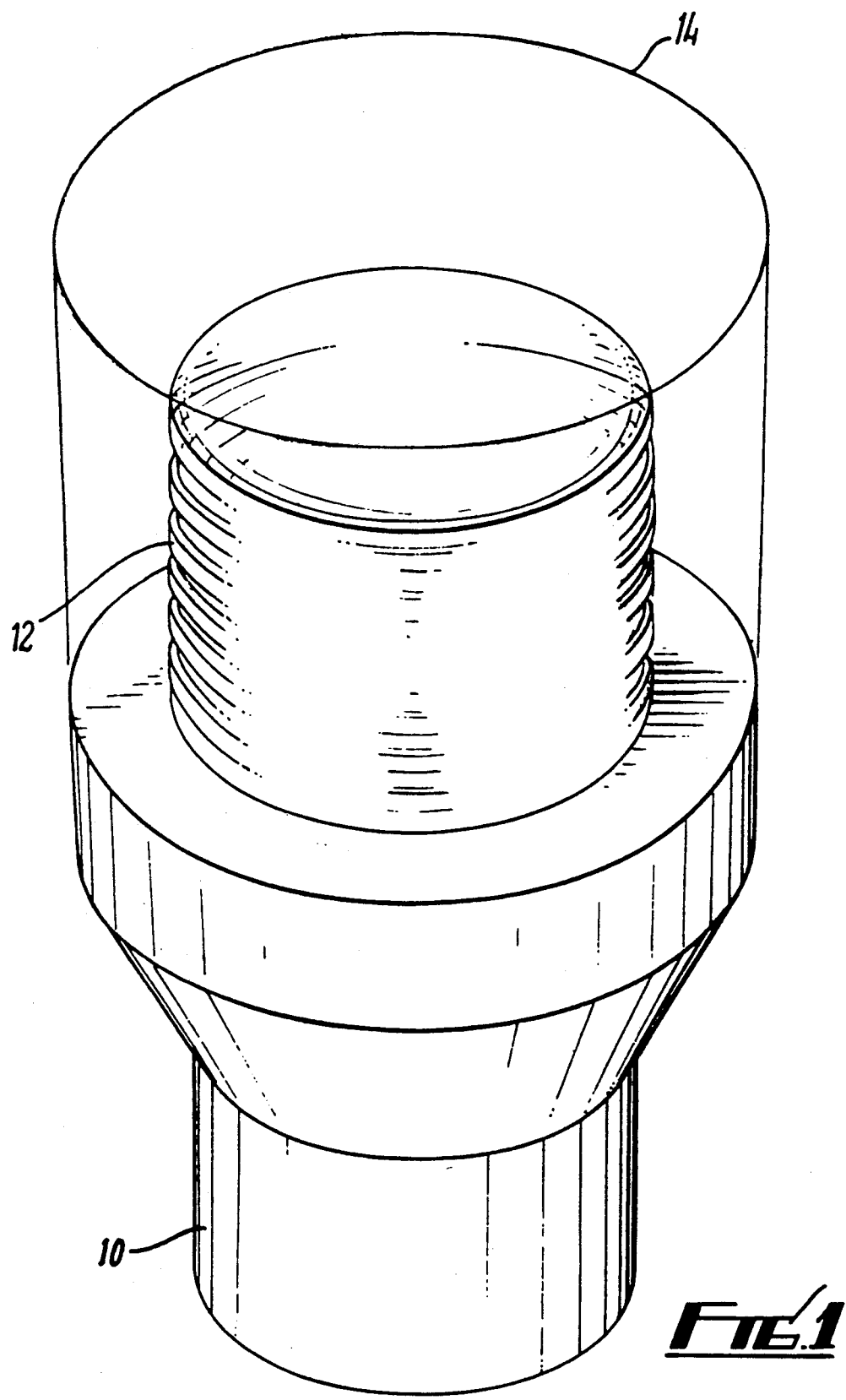
FIG. 1 depicts a wax block cast onto an alloy mandrel ready for machining.

Referring first to FIG. 1, an alloy mandrel 10 has an attachment thread 12 formed on one end. A wax block 14 (shown in ghost outline) is cast around the thread 12 to form an assembly ready for machining to shape.

Figure 2:
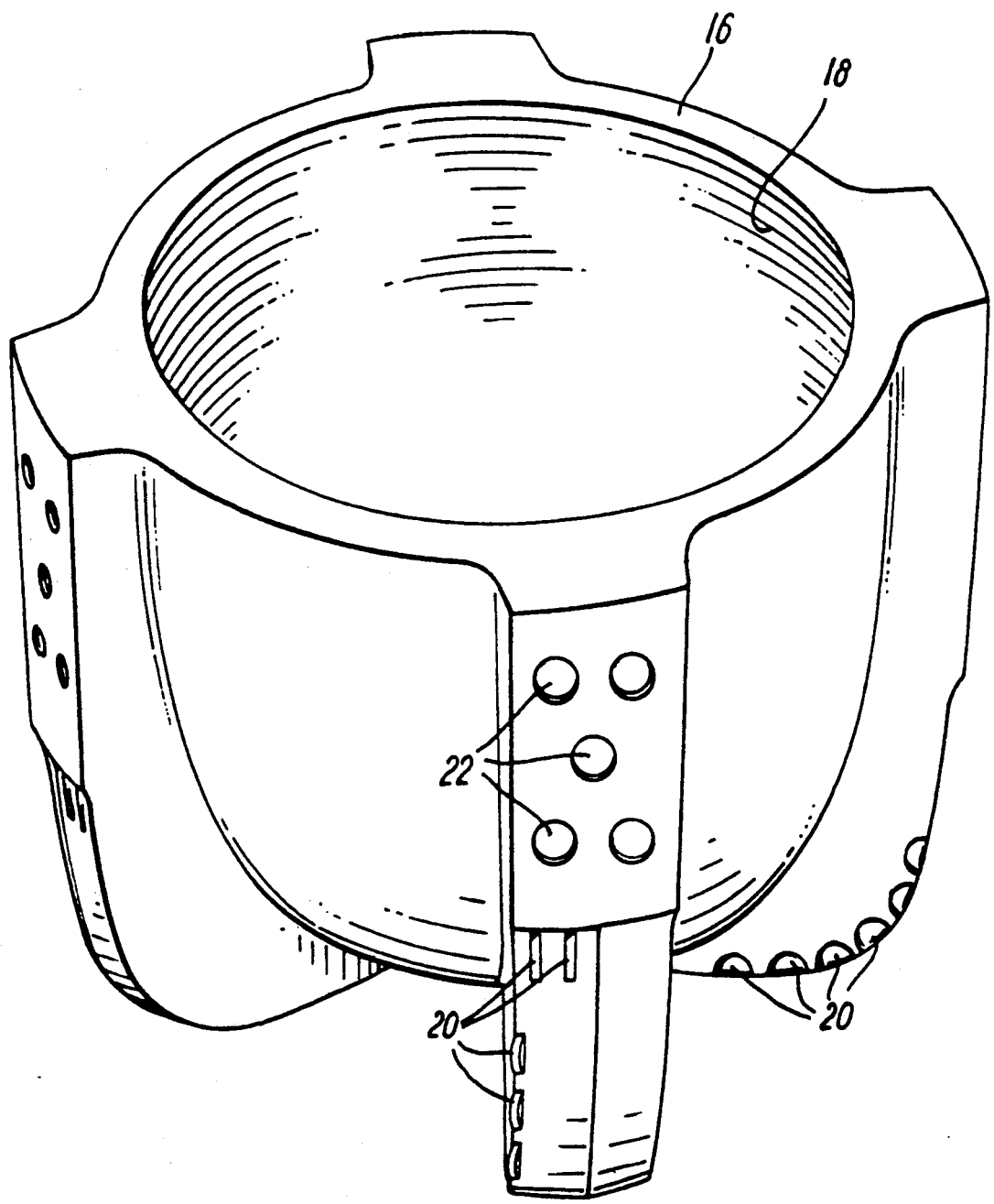
FIG. 2 depicts a wax shell taken off the mandrel after machining.

FIG. 2 shows a wax shell 16 as typically machined from the block 14, and unscrewed from the thread 12 to leave an internal attachment thread 18. The cutter shell 16 has a four-bladed form, with pockets 20 on the blade edges for subsequent mounting of cutter inserts, and side-face pockets 22 for subsequent insertion of hard inserts to maintain cutter gauge against diameter reduction by wear. As an alternative to being machined, the wax shell 16 could be formed by injection moulding.

An investment casting is then formed from the wax shell 16.

Figure 3:
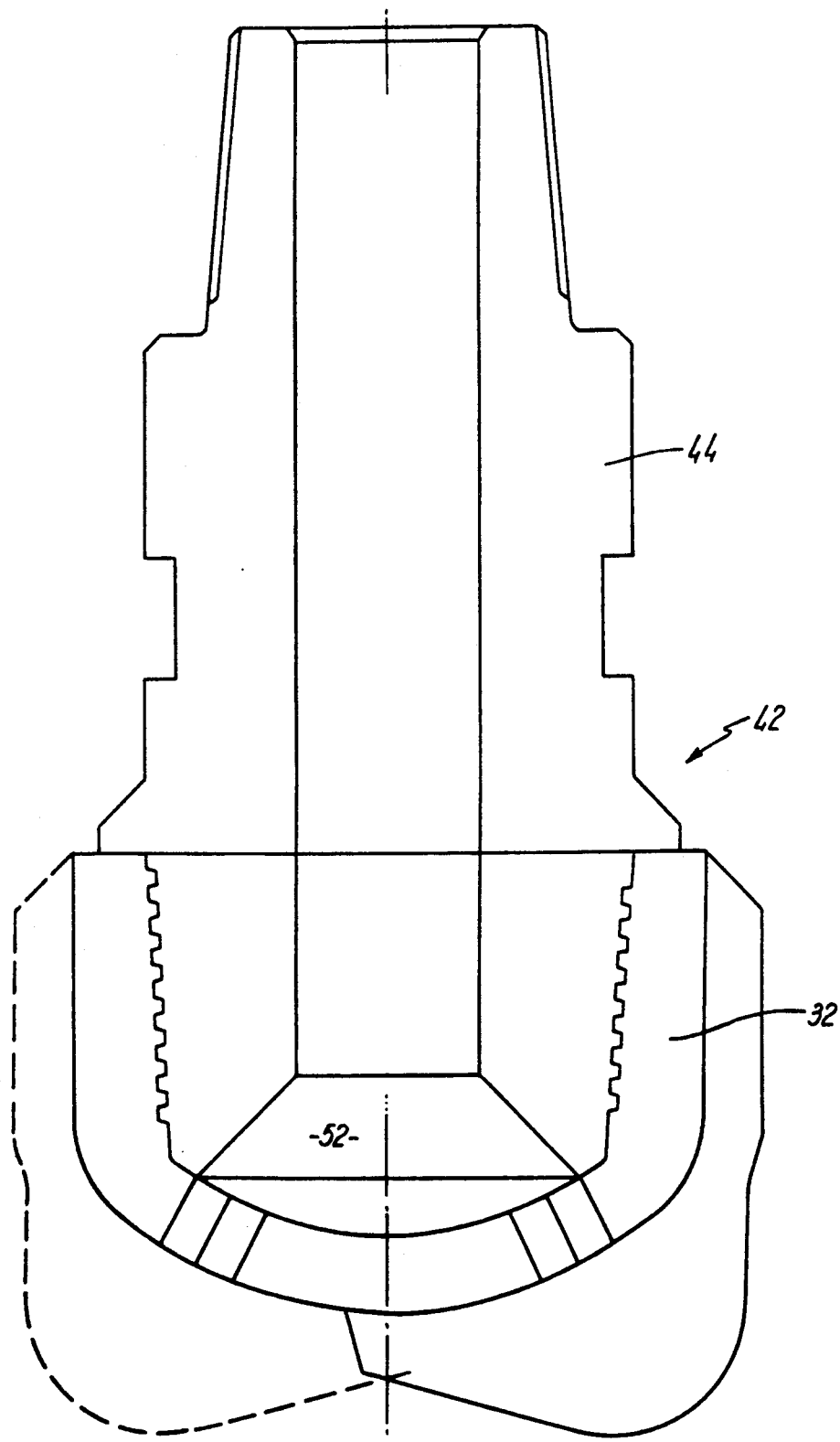
FIG. 3 depicts a pre-machined steel shank screwed into the investment cast bit head.

FIG. 3 shows, in vertical section, the investment casting 32 resulting from the mould 16, screwed onto a pre-machined bit shank 44 to form a two-component drill bit 42. The screw-threaded connection of the casting 32 to the shank 44 is preferably locked by mechanical locking and/or by fusion bonding.

Figure 4:
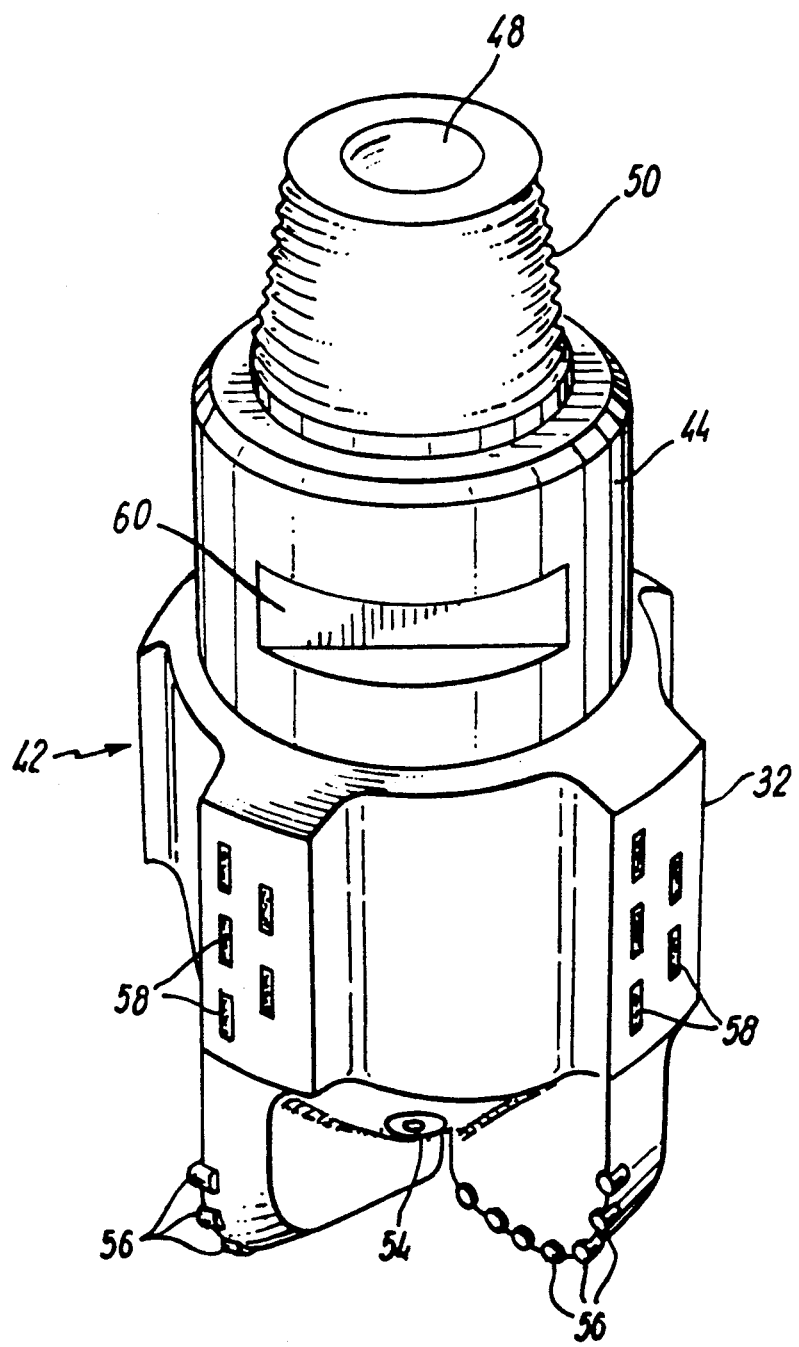
FIG. 4 is a perspective view of a completed drill bit.

FIG. 4 is a perspective view of the complete drill bit 42. A central conduit 48 runs from a connector 50 on the bit shank 44 through to a flow manifold chamber 52 (not visible in FIG. 4, but shown in FIG. 3) and thence to nozzles 54. PDC cutters 56 are mounted in the pre-formed cutter pockets 20 (FIG. 2) in the cutter blade edges, and hard slugs or inserts 58 (of a different shape to that provided for by the pockets 22 in FIG. 2) are fitted in pre-formed pockets in the outer edges of the blades, to act as gauge protectors.

A bit breaker slot 60 allows the temporary attachment of a spanner-like tool (not shown) for detachment of the drill bit 42 from a drill string (not shown) by unscrewing of the connector 50.

The advantages of the present invention are:

Highly accurate investment casting requires minimum of hand grinding, machining etc, prior to cutter installation, thus substantially reducing labour content involved in standard method of producing drill bits/-coreheads (coring bits).

Positive locking mechanisms ensures integrity of bond between the shank and bit head.

Furnacing of the head without shank reduces furnace power consumption and therefore the overall cost.

Mechanical locking mechanism allows for easy recycling of high cost bit head alloy.

Casting method allows for greater flexibility in fluid porting.

Casting method allows for greater flexibility in cutter and gauge insert installation.

Accuracy of casting gives better quality control of cutter pockets and braze bond integrity due to the fine clearances achievable giving good capillary action of the braze.

Injection moulded wax ensures consistency of cutter positioning and therefore bit performance.

Thus has been described a method of manufacture which utilises the investment casting processes to give the degree of accuracy required for producing drill bits/corehead bodies, and enables the hard facing to be applied to a two-part manufacturing process.

Modifications of the above-described process and product can be adopted without departing from the scope of the invention.

I claim:

1. A method of fabricating a drill bit or coring bit, said method comprising the steps of:

investment casting a relatively hard outer shell of said bit as an initially separate component of said bit, said shell being externally formed substantially to the finished external form of said bit;

providing a pre-machined bit shank of a relatively less hard material as an initially separate component of said bit;

said shell and one end of said shank being provided with respective mutually cooperable connecting means; said shank having another end thereof formed as a drill string connector; and mechanically connecting said shell with said bit by connecting the said mutually cooperable connecting means.

2. A method as claimed in claim 1, said method comprising the further step of subsequently locking said mutually cooperable connecting means.

3. A method as claimed in claim 2, wherein said mutually cooperable connecting means are locked by a mechanical lock.

4. A method as claimed in claim 2, wherein said mutually cooperable connecting means are locked by fusion bonding of respective mating surfaces of said cooperable connecting means.

5. A method as claimed in claim 2, wherein said mutually cooperable connecting means are locked by fusion bonding of mutually adjacent portions of said shell and said shank.

6. A method as claimed in claim 1, wherein said mutually cooperable connecting means comprises a female screw thread formed internally in said shell and a cooperable male screw thread formed in said one end of said shank.

7. A method as claimed in claim 1, wherein said relatively hard material of which said outer shell is resistant to abrasive wear and resistant to fluid erosion.

8. A method as claimed in claim 7, wherein said relatively hard material is a high content cobalt alloy.

9. A method as claimed in claim 8, wherein said high content cobalt alloy is stellite.

10. A method as claimed in claim 1, wherein said relatively less hard material of which said pre-machined bit shank is relatively easily machinable and has the capability of withstanding high stress/fatigue levels.

11. A method as claimed in claim 10, wherein said relatively less hard material is steel.

12. A drill bit or coring bit fabricated by the method as claimed in claim 1.

* * * * *